United States Patent

Diaconu et al.

[11] Patent Number: 5,080,277
[45] Date of Patent: Jan. 14, 1992

[54] ANTI-POLLUTANT SOLDERING IRON

[76] Inventors: Sever A. Diaconu; Alen Diaconu, both of P.O. Box 5396, Hickory, N.C. 28603

[21] Appl. No.: 500,206
[22] Filed: Mar. 28, 1990
[51] Int. Cl.⁵ .................................................. B23K 3/03
[52] U.S. Cl. ..................................... 228/42; 219/230; 228/51
[58] Field of Search ........................... 228/20, 51, 42; 219/230

[56] References Cited
U.S. PATENT DOCUMENTS 3,411,594 11/1968 Siegel .............................. 228/20 HT
4,187,973 2/1980 Fortune ........................... 219/230 X
4,205,221 5/1980 Meyer ................................ 219/230
4,948,946 8/1990 Fukunaga ......................... 219/230

Primary Examiner—Kenneth J. Ramsey
Attorney, Agent, or Firm—Olive & Olive

[57] ABSTRACT

An anti-pollutant soldering iron protects workers against pollutant residual vapors resulting from soldering by operating an air moving fan, or the like, to create a suction air stream in a housing which guides pollutant residues trapped therein to and through a retaining filter and then directs the filtered air to the atmosphere. The air moving fan, or the like, may also be reversed to force the residual vapors away from the soldering iron.

9 Claims, 2 Drawing Sheets

ANTI-POLLUTANT SOLDERING IRON

BACKGROUND OF THE INVENTION

1. Field of the Invention

This invention relates broadly to an anti-pollutant device and more specifically to a soldering iron which does not produce any harm to the worker who uses it. The poisonous lead vapors, and all residues resulting from the cleaning paste are not allowed to reach worker's breathing apparatus, being absorbed and retained by filters.

2. Description of the Prior Art

A fan can be used in order to protect the workers against any pollutant factors resulting from soldering. In many cases either the limited space such as inside of a metallic cabinet crowded by many components, or the particular environmental conditions do not permit the use of a fan. While working in a rush, the worker him(-her)self may not pay enough attention to their own protection. Since the fan only carries the vapors away, the environment remains polluted.

Thus there is the need for an inexpensive system to keep the pollutant residues away from workers and to retain them in removeable filters. The provision of such a clean tool becomes the primary object of the invention. Other objects will become more apparent as the description proceeds.

SUMMARY OF THE INVENTION

The soldering iron of the invention uses a miniature propeller fan mounted inside the handle. The propeller fan is driven by a low power electromotor connected on and off as we wish by a micro switch located on the upper part of the handle. The propeller fan creates an absorbing air stream which collects the soldering residual vapors guiding them through a filter to the atmosphere. In very bad working conditions, a second step of speed can be activated, so the absorbtion will increase.

The foregoing and other objects and features of this invention will be more understood from the following description of an illustrastive embodiment thereof taken in conjunction with the accompanying drawings.

DETAILED DESCRIPTION OF THE INVENTION AND PREFERRED EMBODIMENTS THEREOF

Figure 1:
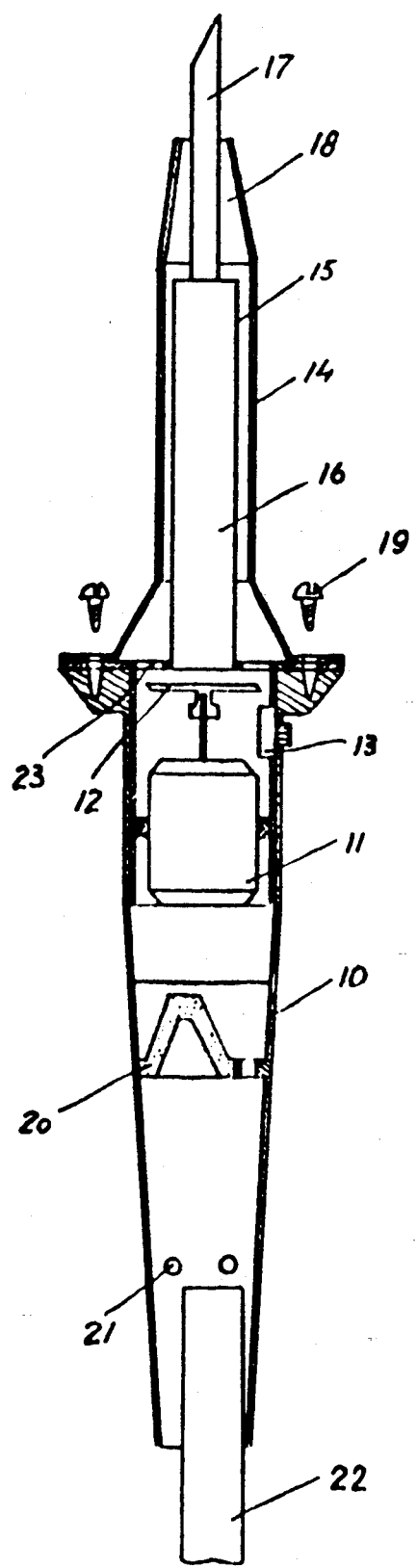
FIG. 1 shows cross-sectional view of the soldering iron of this invention.

Referring to FIG. 1, a hollow handle 10 supports an internally mounted miniature electromotor 11 having a propeller 12. A micro switch 13 is used to activate electromotor 11 and to change the speed whenever it is necessary. Propeller 12 creates an absorbing air stream limited by a housing 14, made of metal or Teflon. An internal housing 15, made of metal or ceramics, contains a heating element 16. The air stream collects the residual vapors from the edge of a tip 17. An internal area 18 guides the air stream through openings 23 to propeller 12. Housing 14 is fixed to handle 10 by screws 19. The air stream comes inside handle 10 and reaches a removable filter 20 which absorbs and retains the solid particles from the air stream. Holes 21 provided in handle 10 guide the cleaned vapors out into the atmosphere. For powers higher than fifty watt the passage to the atmosphere goes through a tubing 22, made of plastic and going along the power cord for about two or three feet. In open areas filter 20 may be removed and the direction of electromotor 11 reversed, so that the air stream will push the pollutant residues away from workers instead of absorbing them. The internal surface of handle 10 may be thermally protected with a thin layer made of mica, asbestos, or teflon. This layer has to be removed from time to time in order to be cleaned.

Figure 2:
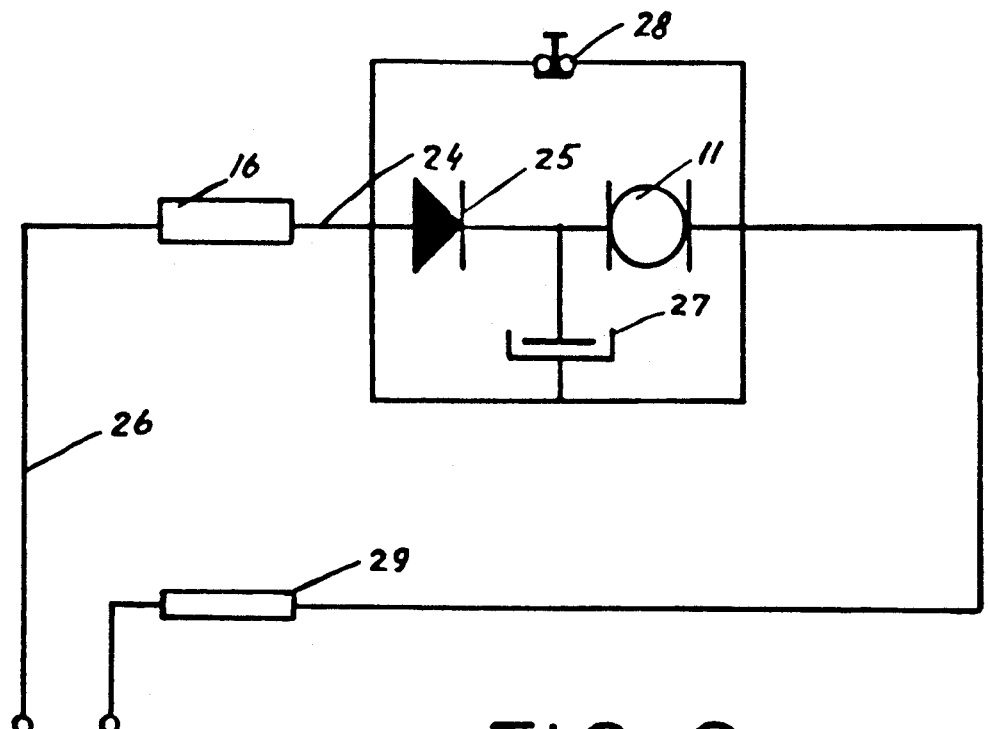
FIG. 2 is a schematic diagram for the circuitry used in the soldering iron of FIG. 1 according to a first embodiment.
Figure 3:
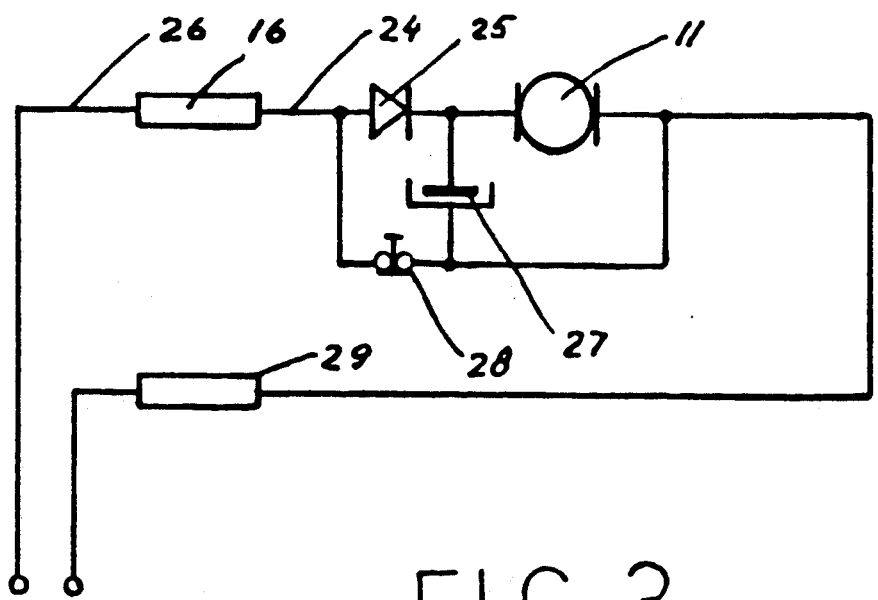
FIG. 3 is a schematic diagram of a circuit arrangement for the soldering iron of FIG. 1 according to a second embodiment.

Referring to FIGS. 2 and 3, heating element 16 is connected with one wire 24 to a rectifying diode 25 and with another wire 26 to one side of an AC power supply. The opposite side of the AC power supply is connected through a fuse 29. A filtering capacitor 27 assures the right amount of D.C. voltage for electromotor 11. By adding a larger capacity in parallel to capacitor 27, the D.C. voltage will increase and a higher speed will be obtained. A normally closed contact 28 connects heating element 16 with A.C. from the power supply. Electromotor 11 does not work when contact 28 is closed since the rectified electromotor circuit is bypassed. Whenever the worker wants to remove the vapors, he(she) has to depress closed contact 28 into the open position and electromotor 11 is activated.

If the soldering iron is a soldering gun type an additional secondary winding can deliver the low voltage to be rectified.

Although a specific embodiment of this invention has been shown and described, it will be understood that various modifications may be made without departing from the spirit of this invention.

We claim:

1. An anti-pollutant soldering iron, comprising:
   (a) a hand held housing for retaining a soldering tool;
   (b) a filter removably positioned in said housing;
   (c) an electric heater means mounted in said housing for heating said tool;
   (d) a miniature DC electromotor mounted in said housing;
   (e) a fan driven by said electromotor;
   (f) a DC supply in series with said electric heater means; and
   (g) means including said fan for guiding residual vapors resulting from soldering through said filter and then to the atmosphere whereby to release only filtered vapors to the atmosphere.

2. An anti-pollutant soldering iron as claimed in claim 1 wherein said electromotor is reversible and when reversed said fan is operable to force said residual vapors away from said tool.

3. An anti-pollutant soldering iron as claimed in claim 1 wherein said fan comprises a propellor.

4. An anti-pollutant soldering iron as claimed in claim 1 including an AC supply connected for energizing said DC supply and said heater means.

5. An anti-pollutant soldering iron as claimed in claim 4 including an on-off switch connected to said DC supply and operable when closed to deenergize said electromotor.

6. An anti-pollutant soldering iron comprising:

(a) a hand-held hollow housing having a forward portion and a rearward portion;
(b) a soldering tip and associated electrical heating means positioned in said forward portion;
(c) an electromotor mounted in said housing;
(d) an air moving means positioned within said housing and connected to be driven by said electromotor for inducing an air stream to flow past said tip and into said housing to cause residual vapors resulting from soldering to enter said air stream;
(e) a removable filter positioned rearwardly of said electromotor, and within said housing in the path of said stream;
(f) means for energizing said electrical heating means; and
(g) means operative while said electrical heating means is energized for selectively energizing said electromotor to thereby actuate said air moving means to cause residual vapors resulting from soldering to enter said air stream and be trapped in said filter and unpolluted vapors to be expelled from said housing.

7. The anti-pollutant soldering iron according to claim 6, wherein said air moving means comprises a propeller type fan mounted on said electromotor.

8. The anti-pollutant soldering iron according to claim 6, wherein said electromotor is a reversible electric motor enabling said air stream when said electromotor is reversed to be directed out of said forward portion of said housing causing residual vapors to be expelled away from said soldering tip.

9. The anti-pollutant soldering iron according to claim 6, wherein said electromotor further comprises a miniature DC electromotor and an electric DC supply means for powering said miniature DC electromotor from an AC source.

* * * * *